Aug. 2, 1960    R. McFARLAND, JR    2,947,325
VALVE DIAPHRAGM AND METHOD OF MAKING THE SAME
Filed Feb. 6, 1956    3 Sheets-Sheet 1
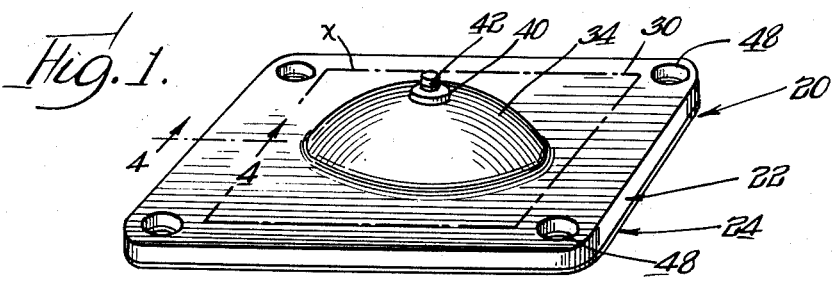
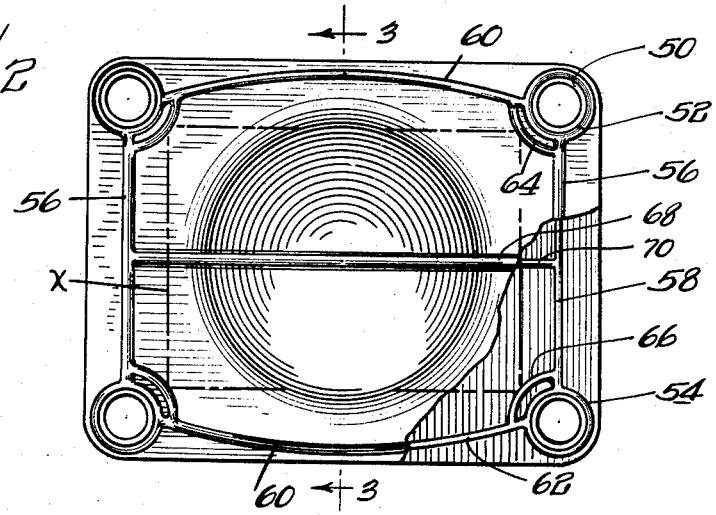
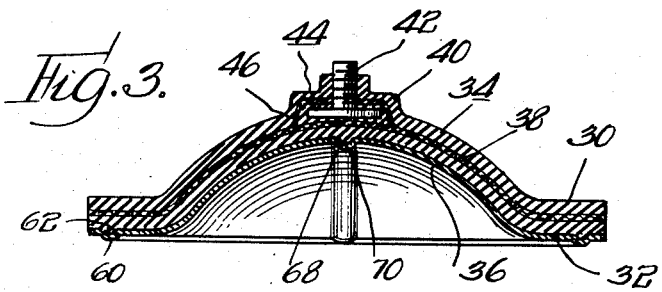
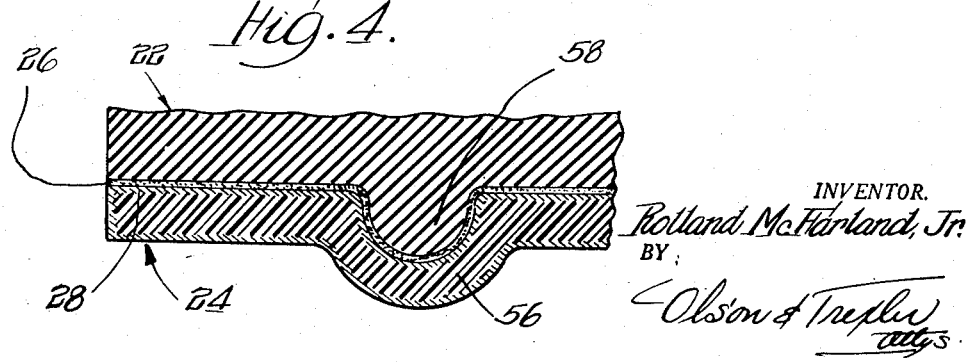
INVENTOR.
Rolland McFarland, Jr.
BY
Olson & Trexler
attys.

Aug. 2, 1960 R. McFARLAND, JR 2,947,325
VALVE DIAPHRAGM AND METHOD OF MAKING THE SAME
Filed Feb. 6, 1956 3 Sheets-Sheet 2
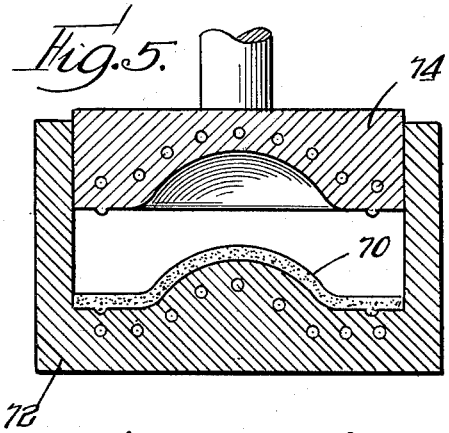
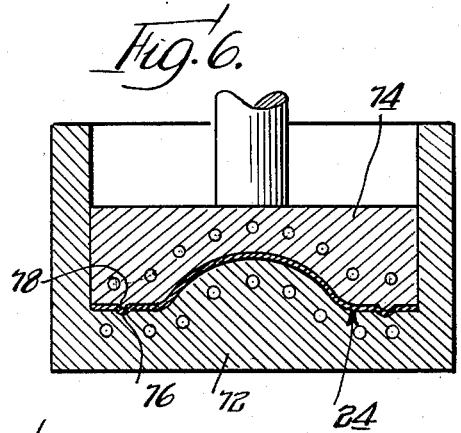
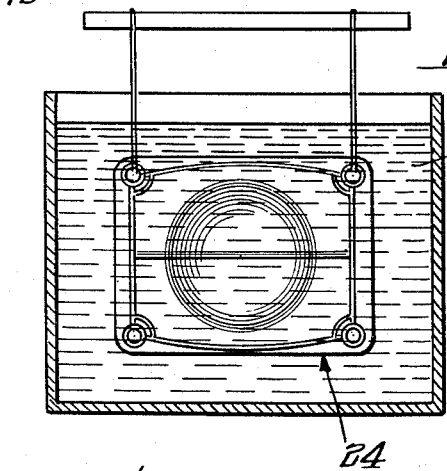
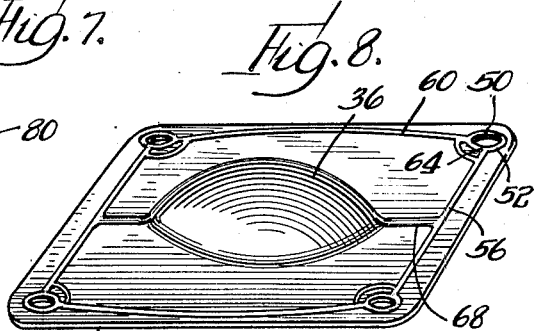
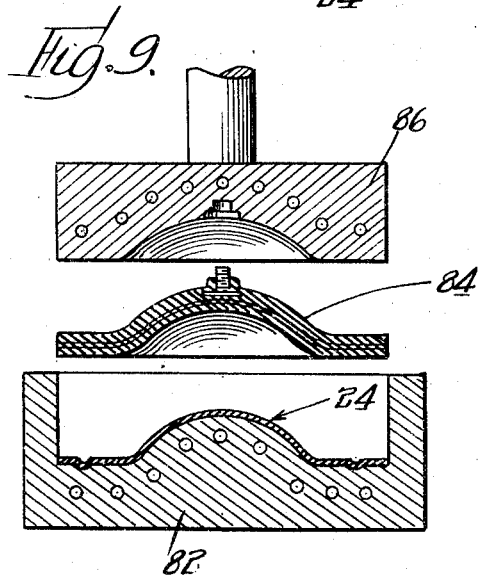
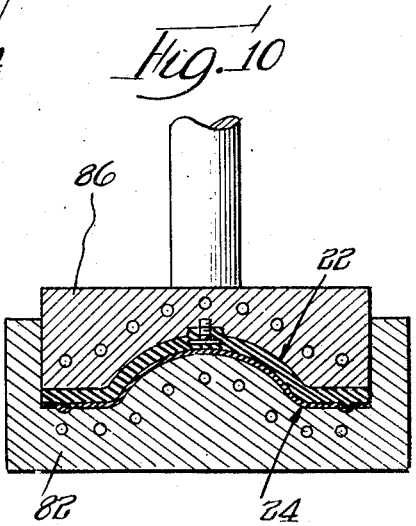
INVENTOR.
Rolland McFarland, Jr.
BY Olson & Trexler
Attys Aug. 2, 1960 R. McFARLAND, JR 2,947,325
VALVE DIAPHRAGM AND METHOD OF MAKING THE SAME
Filed Feb. 6, 1956 3 Sheets-Sheet 3
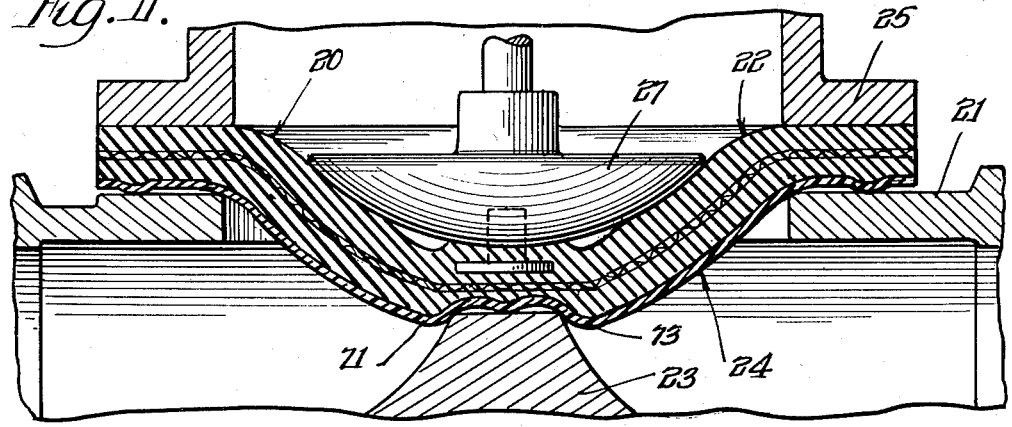
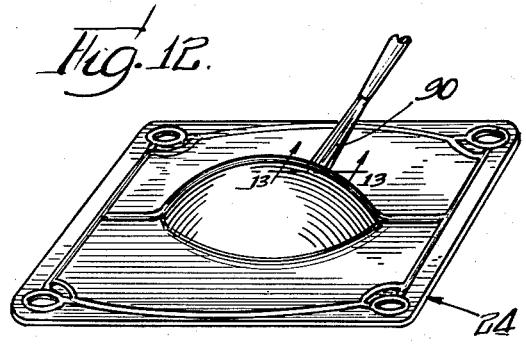
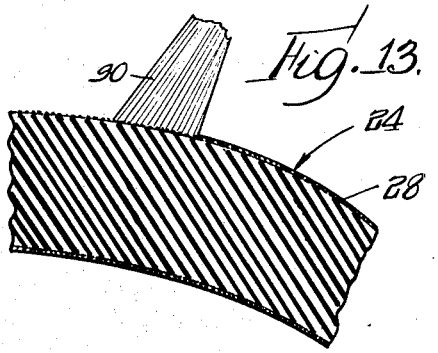
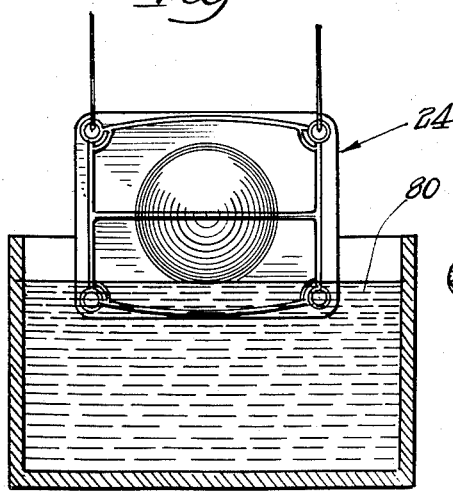
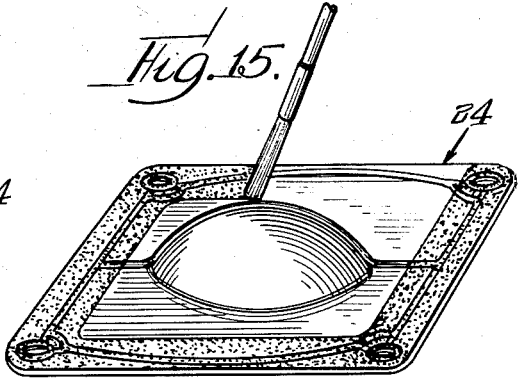
INVENTOR.
Rolland McFarland, Jr.
BY Olson & Trexler
attys.

United States Patent Office 2,947,325
Patented Aug. 2, 1960

2,947,325

VALVE DIAPHRAGM AND METHOD OF MAKING THE SAME

Rolland McFarland, Jr., Crystal Lake, Ill., assignor to Hills-McCanna Company, Chicago, Ill., a corporation of Illinois Filed Feb. 6, 1956, Ser. No. 563,554

6 Claims. (Cl. 137—793)

The present invention relates to a novel flexible diaphragm and, more particularly, to a novel flexible diaphragm structure especially useful in valves and the like.

Valve structures utilizing rubber or rubber-like diaphragms have long been provided, and when such a valve structure is to be installed in a system handling corrosive materials, it is necessary to protect the rubber or rubber-like diaphragm with a liner member formed from a material which is resistant to attack by the corrosive product in the system. Liner members formed from polytetrafluoroethylene sold under the name Teflon are especially desirable as a result of the substantially chemically inert characteristics of this material. However, this very characteristic of Teflon makes it difficult to secure such liner members to the main rubber or rubber-like body of the diaphragm. Therefore, Teflon liner members have usually been provided as elements separate from the diaphragm so that handling, shipping and assembling problems are complicated. It also has been proposed to connect mechanically Teflon liner members with a rubber or rubber-like body, but this is relatively difficult and expensive as compared with the present invention.

It is an important object of the present invention to provide a novel diaphragm structure including a main body portion and a Teflon liner member secured thereto, and to provide a novel method for making this diaphragm structure relatively economical.

A more specific object of the present invention is to provide a novel diaphragm structure which includes a Teflon liner member adhesively secured to a main body portion, and a method for producing such a diaphragm structure.

One problem which has been encountered with diaphragm structures of the above described type is that the liner member when formed from a substantially inelastic material may be ruptured under pressures applied thereto when the diaphragm structure is pressed against a seat or valve weir or the like by a compressor member of the valve, and another important object of the present invention is to provide a novel diaphragm structure wherein a liner member of Teflon or other substantially inelastic material is adhesively connected to the main diaphragm body in a manner so as to preclude rupturing or tearing of the diaphragm.

A further object of the present invention is to provide a novel diaphragm structure of the above described type formed so as to insure sealing engagement with cooperative portions of a valve body or the like, and a novel method for economically and easily producing the diaphragm structure.

Other objects and advantages of the present invention will become apparent from the following description and the accompanying drawings wherein:

Fig. 1 is a perspective view showing a flexible diaphragm structure incorporating the features of the present invention;

Fig. 2 is a bottom view partially broken away showing the novel diaphragm structure of the present invention;

Fig. 3 is an enlarged sectional view taken along line 3—3 in Fig. 2;

Fig. 4 is a substantially enlarged fragmentary sectional view taken along line 4—4 in Fig. 1;

Figs. 5 and 6 are sectional views showing successive steps in the method of molding the Teflon liner member;

Fig. 7 is a view showing a step of treating the liner member to activate the surface thereof so that the liner member may be adhesively secured to the main body portion of the diaphragm structure;

Fig. 8 is a perspective view showing the liner member;

Fig. 9 is a sectional view showing the manner of assembling the diaphragm member and a raw rubber diaphragm body preform having its face frictioned or coated with an adhesive cement in a curing mold;

Fig. 10 is a fractional view showing the step of finally molding and curing the diaphragm assembly;

Fig. 11 is a fragmentary sectional view showing a novel diaphragm structure incorporating the features of the present invention mounted in a valve structure and compressed against a valve weir;

Fig. 12 is a perspective view showing one method of processing a liner member prior to adhesively securing the liner member to the main diaphragm body member so as to preclude injury to the liner member;

Fig. 13 is an enlarged fragmentary sectional view taken along line 13—13 in Fig. 12;

Fig. 14 is a view similar to Fig. 7 but showing an alternative method for treating the liner member to activate only selected surface portions thereof; and Fig. 15 is a perspective view showing an alternative method of applying adhesive material to selected portions of the liner member so as to preclude injury to the liner member.

Referring now more specifically to the drawings wherein like parts are designated by the same numerals throughout the various figures, a unitary diaphragm assembly 20 is shown. While certain features of the present invention may be incorporated in various diaphragm structures, the diaphragm 20 is especially adapted to be mounted in various diaphragm-type valve structures which are sufficiently well-known so that they need not be shown or described in detail herein. As shown in Fig. 11, such valve structures usually include a valve body 21 having a passageway therethrough which is partially blocked by a transverse weir 23, and the diaphragm is clamped between the body and a valve bonnet 25 and may be flexed to and from engagement with the weir for closing and opening the valve. A suitable actuated compressor 27 is provided for pressing the diaphragm against the weir.

The diaphragm structure 20 comprises a main relatively thick body member 22 formed from any suitable flexible material and preferably formed from rubber or a synthetic rubber-like material. A liner member 24 is secured to the inner surface of the body member 22 for protecting the body member against attack by material flowing through the valve in which the diaphragm is assembled. In accordance with an important feature of the present invention, the liner member is preferably formed from polytetrafluoroethylene and, as shown best in Fig. 4, is adhesively secured to the body member 22 by cement 26. Polytetrafluoroethylene is substantially chemically inert and, therefore, the liner member 24 normally cannot be adhesively secured to the diaphragm body member by means of any known cementing material. However, this difficulty has been overcome by providing the liner member 24 with a chemically activated surface portion 28 to which the adhesive material will adhere so that the liner member can be bonded to the body member by the adhesive material. The depth of the surface portion 28 is shown greatly enlarged for illustrative purposes in Fig. 4, and preferably, the liner member is formed with a substantially monomolecular activated surface portion in the manner described below. Various known cements or pressure sensitive adhesives may be used for the layer of adhesive material 26 between the body and liner members. One suitable adhesive may comprise a solution or dispersion soluble or partly soluble synthetic resin in suitable solvents. Specifically, the solvents may be xylene or carbontetrachloride. A synthetic elastomer such as neoprene type AC may also be added, mixed with or containing a portion of magnesium oxide or zinc oxide as curing agents. An accelerator may also be added. In some instances it may also be desirable to add lead oxide, and the resin may be coumarine-indene resin or a phenolic resin condensation product for increased tack.

The body member 22 and the liner member 24 are formed with mating peripheral portions 30 and 32 which are adapted to be clamped between valve body and bonnet members and in the embodiment shown, these peripheral portions are substantially flat. The diaphragm body and liner member are also provided with centrally located mating domed sections 34 and 36 respectively which may be flexed downwardly from the position shown in Fig. 3 in a known manner to close a valve. A fabric sheet 38 is embedded in the body member 22 for reinforcement purposes. The diaphragm body member is provided with a central enlargement 40 in which there is embedded a stud member 42 having a head 44 for connecting the diaphragm assembly with the compressor 27. Preferably, a reinforcing fabric sheet 46 is embedded in the diaphragm body member over the head of the stud. In the embodiment shown, the diaphragm body and liner members are provided with a plurality of sets of aligned apertures 48 and 50, which sets of apertures are spaced about the periphery of the diaphragm assembly for receiving bolts or the like, not shown, used to clamp the valve bonnet against the valve body with the diaphragm disposed therebetween.

In order to insure sealing engagement of the diaphragm assembly with a valve body or the like, the liner member is formed with rib means projecting from its outer face and corresponding groove means at its inner face, and the body member 22 is provided with rib means which project into the groove means of the liner member and backs up the rib means of the liner member. More specifically, the liner members is provided with annular ribs 52 encircling each of the apertures 50 adjacent the corners thereof, and the body member 22 is provided with a plurality of annular ribs 54 mating with the ribs 52. A rib 56 traverses each end of the liner member and merges with a pair of the annular ribs 52 as shown best in Figs. 2 and 8 and the body member 22 is provided with mating opposite end ribs 58. Similar opposite side ribs 60 and 62 are provided along opposite sides of the liner member and body member respectively and merge with the annular ribs, as shown. In order to provide a double seal adjacent each of the bolt holes, a plurality of sets of mating arcuate ribs 64 and 66 are provided in the liner member and body member respectively. Each set of arcuate ribs is disposed radially within and adjacent each set of the annular ribs and merges with adjacent side and end ribs. In order to insure sealing engagement of the diaphragm with the weir 23 when the diaphragm is flexed to a valve closing position, generally centrally located ribs 68 and 70 are formed in the liner member and body member respectively for cooperation with the weir, which ribs substantially completely traverse the diaphragm assembly and merge with the opposite end ribs. It is to be noted that the inner surface of the diaphragm body 22 conforms substantially exactly to the inner surface of the liner member so as to insure a sufficiently good adhesive bond between at least peripheral portions of the surfaces to prevent air from entering between the two members. Thus, the liner member will always follow the flexing movement of the body member and cannot be pulled from the body member even in the event a vacuum is applied to the system in which a valve including the diaphragm assembly 20 is installed.

When the diaphragm structure is forced against the weir, as shown in Fig. 11, to close the valve, the rubber or rubber-like body member acts somewhat like a fluid under the pressure provided by the compressor 27 so that the diaphragm tends to bulge downwardly as indicated at 71 and 73 on opposite sides of the weir. The Teflon liner member is substantially inelastic, and it has been found that if the adhesive bond between the liner member and the central portion of the main diaphragm body member is sufficiently strong so that the central portions of the liner member and the body member are permanently connected, the forces imposed upon the liner member at the bulging areas 71 and 73 of the rubber-like or rubber body member are localized and cause rupturing or tearing of the liner member at these areas. In accordance with an important feature of the present invention, the liner member is adhesively secured to the main diaphragm body member in a manner so that at least after the first flexing of the diaphragm structure, the central portion of the liner member is not adhesively connected to the central portion of the main body member. This enables the localized pressures exerted by the bulging main body member at the areas 71 and 73 to be distributed over a sufficient area of the liner member to prevent tearing of the liner member. This may be accomplished by initially providing a low grade adhesive bond between the central portions of the liner and body members so that this adhesive bond will break during initial flexing of the diaphragm structure or by initially adhesively connecting only peripheral portions of the members in the manner described fully hereinbelow. The broken line $x$ in Figs. 1 and 2 diagrammatically illustrates demarcation between the high degree of adhesion and the low degree of, or absence of, adhesion between the liner and the body member.

The method of producing the diaphragm structure 20 will now be described. The liner member 24 is premolded to provide the finished article shown in Fig. 8. More specifically, a layer 70 of powdered polytetrafluoroethylene is built up to a thickness approximately four times the final thickness of the liner member on a properly shaped surface of a mold 72 as shown in Fig. 5 whereupon the powdered polytetrafluoroethylene is compressed under heat and pressure between the mold 72 and a cooperable mold 74. The mold members respectively are provided with mating groove and rib means 76 and 78 so as to form the liner member with the various ribs described above.

After the liner member has been molded, in accordance with one embodiment of the invention, it is dipped completely into a solution 80 of liquid ammonia and sodium as shown in Fig. 7, which solution acts upon the liner member so as to provide it with a substantially monomolecular chemically active or unsaturate surface. The interior portions of the liner member are unaffected by the solution so that the liner member remains effective for protecting the body member of the diaphragm assembly.

The premolded and surface activated liner member is placed in a mold 82 as shown in Fig. 9, which mold has a surface essentially identical to the surface of the mold 72 and, therefore, the outer face of the liner member. Thus, the liner member fits the mold 82 exactly and, in effect, provides a mold surface for the rubber or rubber-like diaphragm body member during subsequent molding and curing of the body member. After the liner member 24 is positioned in the mold 82, a diaphragm body preform 84 is placed on top of the liner member. The diaphragm body preform is usually built up by hand from layers of raw or camel back rubber and canvas or fabric sheets between which layers and sheets is applied a suitable elastic cement.

Before the body preform is positioned on the liner 24 in the mold, a layer or coating of adhesive material is applied to the inner face of either the body preform or the liner member or to both faces, if desired. The adhesive material is such as to provide a low grade adhesion having, for example, about one pound per inch free pull. This is sufficient to retain the liner and body members in assembled relationship and to permit the central portions of the members to separate when the diaphragm is flexed. Then a mold member 86 is pressed against the assembly as shown in Fig. 10 so that the body preform is molded against and adhesively secured to the inner face including the groove portions of the liner member, and the assembly is maintained under heat and pressure until the diaphragm body has been cured.

In accordance with a modified embodiment of the present invention, the low grade adhesion may be obtained between the central portions of the liner and diaphragm body members by removing portions of the chemically activated surface from the central or domed section of the liner member. As shown in Figs. 12 and 13 this may be accomplished by means of a sandblast 90 or the like. It will be appreciated that the degree of adhesion may be controlled, as desired, by removing greater or lesser portions of the activated surface so as to expose greater or lesser areas of the substantially chemically inert polytetrafluoroethylene beneath the activated surface. When the liner member is treated in this manner, a cement or adhesive material having high grade adhesion characteristics, for example, about sixty pounds per inch free pull, may be used so as to insure the provision of a strong permanent bond between peripheral portions of the liner and body members while still permitting separation of the central portions of these members when the diaphragm is flexed as shown in Fig. 11.

In accordance with another embodiment of the present invention, the liner member may be secured to the main diaphragm body member so that only peripheral portions of the members are initially adhesively connected. This may be accomplished, as shown in Fig. 14, by dipping only marginal portions of the liner member into the solution so that only such marginal portions are provided with chemically activated surfaces. Alternatively, the adhesive material may be applied to marginal portions of the liner member as shown in Fig. 15, which liner member may have either its entire surface or only peripheral surface portions chemically activated. While these methods provide a satisfactory product, they are usually more time consuming and, therefore, not as commercially acceptable as the methods discussed above since considerable care must be exercised in order to avoid activating central portions of the liner member surface if the process of Fig. 14 is followed and in order to maintain the central liner member portion free from adhesive material when the process of Fig. 15 is followed.

While the preferred embodiments have been shown and described herein, it is obvious that many structural details may be changed without departing from the spirit and scope of the appended claims.

The invention is claimed as follows:

1. A diaphragm structure comprising a flexible elastic body member, an imperforate polytetrafluoroethylene liner member having a chemically active surface portion, and means chemically bonding said surface portion to said body member with relatively weak adhesion for permitting separation of said surface portion from said body member upon flexing of the diaphragm structure.

2. A diaphragm structure comprising a flexible elastic body member, an imperforate polytetrafluoroethylene liner member having a surface portion which is partially chemically active and partially chemically inert, means adhesively connecting said body member to said surface portion which is only sufficiently chemically active to obtain relatively weak adhesion for permitting separation of said surface portion from the body member upon flexing of the diaphragm structure.

3. A diaphragm structure comprising a flexible resilient body member, a polytetrafluoroethylene liner member disposed against one face of said body member, said liner member including substantially continuous mating rib and groove means respectively at outer and inner faces thereof and generally peripherally disposed for engaging a member against which the diaphragm structure is to be clamped for sealing purposes, said body member having rib means molded into said groove means for backing up the rib means of said liner member, said liner member including a chemically active surface portion at its inner face, and adhesive material between said body member and said liner member and adhesively connecting said last mentioned members.

4. A diaphragm structure for valves and the like comprising a flexible rubber-like body member, a polytetrafluoroethylene liner member disposed substantially against one face of said body member, said liner member including mating rib and groove means respectively at outer and inner faces thereof and traversing a mid-portion thereof, which rib means is sealingly engageable with a valve weir or the like, said body member including rib means molded into said groove means for backing up the rib means of said liner member, said liner member including a chemically active surface portion at said inner face, and adhesive material between said body member and said chemically active surface portion and adhesively connecting said members.

5. A valve diaphragm structure adapted for flexing in a valve asembly between an open position and a closed position tightly compressed against a valve seat; said structure comprising a flexible elastic body member, a flexible substantially inelastic and imperforate polytetrafluoroethylene liner member having a chemically active surface on one side thereof and disposed against said body member, and means chemically bonding said body member to the chemically active surface of said liner member providing therebetween a bond which is relatively weak at areas where stress is applied during flexing of the diaphragm structure to permit yielding of the bond with resultant movement between the liner member and body member in the stressed areas whereby to distribute local stresses in the liner member when the valve diaphragm structure is tightly compressed against the valve seat.

6. A valve diaphragm structure as claimed in claim 5, wherein the central portions of the body member and liner member are dome-shaped with the relatively weak bond therebetween permitting movement between the dome-shaped central portions in the stressed areas.

References Cited in the file of this patent

UNITED STATES PATENTS

| | | |
|---|---|---|
| 2,533,501 | Pendleton et al. | Dec. 12, 1950 |
| 2,654,559 | Franck | Oct. 6, 1953 |
| 2,702,006 | Bachert | Feb. 15, 1955 |
| 2,705,691 | Panagrossi et al. | Apr. 5, 1955 |
| 2,710,629 | Price | June 14, 1955 |
| 2,728,698 | Rudner | Dec. 27, 1955 |
| 2,770,799 | Horn | Nov. 13, 1956 |